(12) United States Patent
Dehlsen et al.

(10) Patent No.: US 7,789,252 B2
(45) Date of Patent: Sep. 7, 2010

(54) WIND TURBINE NACELLE WITH INTEGRAL SERVICE CRANE FOR ACCESSING TURBINE COMPONENTS

(75) Inventors: James G. P. Dehlsen, Montecito, CA (US); Rahul R. Yarala, Camarillo, CA (US)

(73) Assignee: Clipper Windpower, Inc., Carpenteria, CA (US)

( * ) Notice: Subject to any disclaimer, the term of this patent is extended or adjusted under 35 U.S.C. 154(b) by 0 days.

(21) Appl. No.: 11/885,778

(22) PCT Filed: Feb. 21, 2007

(86) PCT No.: PCT/IB2007/000420

§ 371 (c)(1),
(2), (4) Date: Sep. 5, 2007

(87) PCT Pub. No.: WO2007/107817

PCT Pub. Date: Sep. 27, 2007

(65) Prior Publication Data

US 2008/0245756 A1    Oct. 9, 2008

(51) Int. Cl.
B66C 23/18    (2006.01)
(52) U.S. Cl. .................................... 212/179; 212/226
(58) Field of Classification Search .............. 212/179, 212/226

See application file for complete search history.

(56) References Cited

U.S. PATENT DOCUMENTS

| | | | | |
|---|---|---|---|---|
| 758,399 A | * | 4/1904 | Wilke ........................... 104/98 |
| 1,530,337 A | * | 3/1925 | Wickland .................... 414/364 |
| 2,846,081 A | * | 8/1958 | Moore et al. ................. 212/317 |
| 3,245,551 A | * | 4/1966 | Van Hezik .................... 212/199 |
| 3,952,836 A | * | 4/1976 | Thoma ......................... 187/259 |
| 3,960,242 A | * | 6/1976 | Saxonmeyer ................. 182/36 |
| 4,502,527 A | * | 3/1985 | Brewer ......................... 164/418 |
| 4,561,551 A | * | 12/1985 | Goussinsky ................. 212/312 |
| 4,611,440 A | * | 9/1986 | Kalve ............................. 52/65 |
| 2007/0273154 A1 | * | 11/2007 | Pedersen ...................... 290/44 |

FOREIGN PATENT DOCUMENTS

| | | |
|---|---|---|
| CH | 653 524 A1 * | 2/1982 |
| DE | 10 2005 025 646 A1 * | 12/2006 |
| EP | 1 284 365 A2 | 2/2003 |

(Continued)

*Primary Examiner*—Thomas J. Brahan
(74) *Attorney, Agent, or Firm*—Fay Sharpe LLP

(57) ABSTRACT

A service crane for a wind turbine comprising a main crane beam (128) having a track (154) that accommodates a trolley (156). A hinge (144) is provided at a pivot point (148) near a proximate end of the main beam (128), such that an aft portion of the main beam (128) extends beyond the pivot point (148) to the exterior of the turbine. A distal end of the main beam (128) rests upon a forward beam. A lateral motion actuator (134) moves the main beam (128) back and forth along the forward beam. The trolley (156) runs back and forth along the main beam (128). A turbine component is attached to a hook lowered by cable from the trolley (156). The trolley (156) with the component on the hook is moved to the aft portion of the main beam (128), which extends beyond the turbine. The hook is lowered to the ground so that the component can be serviced or replaced.

18 Claims, 4 Drawing Sheets

FOREIGN PATENT DOCUMENTS

| | | |
|---|---|---|
| EP | 1 291 521 A1 | 3/2003 |
| EP | 1 655 261 A1 * | 5/2006 |
| FR | 2477611 A5 * | 9/1981 |
| JP | 2005 201128 | 7/2005 |
| SU | 744095 A * | 6/1980 |
| SU | 1364599 A1 * | 4/1986 |
| SU | 1604722 A1 * | 11/1990 |
| WO | WO 2005/031159 A1 | 4/2005 |

* cited by examiner

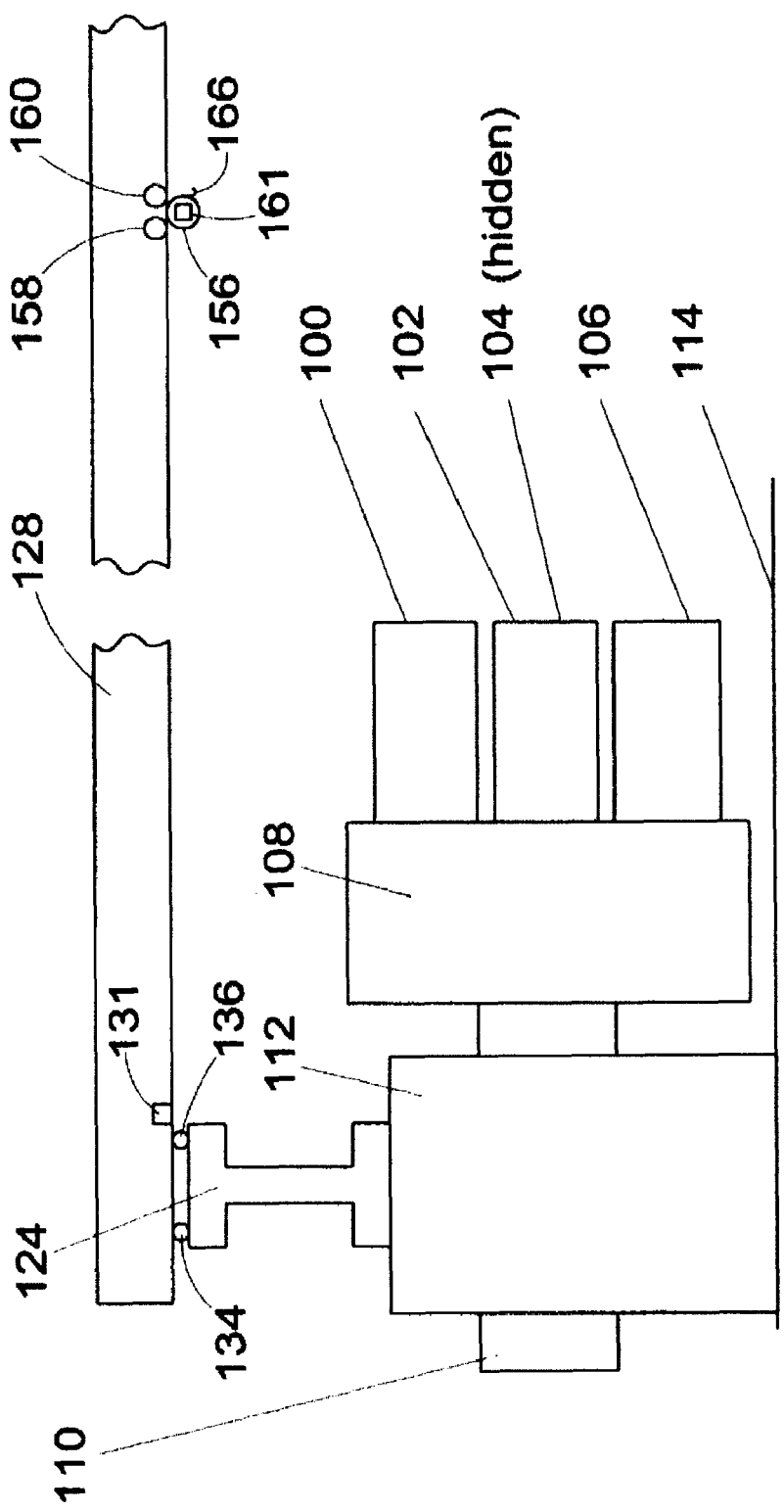

WIND TURBINE NACELLE WITH INTEGRAL SERVICE CRANE FOR ACCESSING TURBINE COMPONENTS

FIELD OF THE INVENTION

This invention relates to wind turbines housed in a nacelle atop a tall tower, and more particularly to an integrated service crane for accessing turbine components atop high towers.

DESCRIPTION OF THE PRIOR ART

The cost of wind-generated electricity has been dropping due to technological innovations and economies of scale. The average turbine size is now approximately 1.5 MW with rotor diameters ranging from 70 to 85 m. This class of turbines has on average a nacelle weight of 50 tons (generators, gear box and nacelle housing) and a rotor weight of approximately 35 tons. To improve the economics of wind turbines, manufacturers have been designing taller towers to take advantage of greater wind energy at higher levels above ground. Manufacturers are increasingly relying on 80 and 100 m tower designs, rather than the shorter towers used previously. The cost of lowering and lifting these weights from/to the top of tall land based towers for servicing can be prohibitive, mainly due to the reach of conventional cranes, which require much higher crane capacity than the actual weight being lifted. This is due to the bending moment resulting from the reach of conventional cranes.

U.S. Pat. No. 6,955,025 discloses a method of raising a wind turbine tower wherein the nacelle and turbine generators housed in the nacelle are raised together, such that once the tower is raised the nacelle is at the top of the tower. It is possible using the method described therein to lower the tower and nacelle to replace the nacelle and turbine. However for routine maintenance or replacement of only one component, such as one generator, it is not cost effective to lower the entire nacelle. Only the defective component need be lowered.

In the conventional method of the prior art, using a typical crane at ground level, a drivetrain or a component thereof is lifted up and over the top of a nacelle located on the top of a tall tower. The drivetrain or component is then lowered through a hatch door in the top of the nacelle. The reverse procedure is used to remove and lower components for servicing. A 50-ton drivetrain lift would require a 400-600 ton crane. This higher capacity is required due to the high bending moment associated with the crane reach.

Currently wind turbines require that a crane or special apparatus to be brought to the wind turbine site for accessing the components through removal of the nacelle top, in order to remove components out of the nacelle top and lower them down to the ground for repair or replacement. This adds a substantial cost for repair and component replacement activity leading to an increase in the cost of energy.

It is desirable to provide an apparatus which facilitates the repair and replacement of wind turbine components and lowers the costs of such repair and replacement.

SUMMARY OF THE INVENTION

Briefly, the invention is concerned with a wind turbine service crane for lifting heavy turbine components onto the top of a very tall tower (80-100 m).

The service crane for a wind turbine comprises a movable main crane beam having a track for guidance of a trolley, a first frame comprising a hinge at a pivot point, wherein the crane beam is connected to the hinge such that a portion of the crane beam extends beyond the pivot point, a stationary beam which is connected with a distal end of the crane beam such that the crane beam can laterlly move along the stationary beam.

According to one embodiment of the present invention, the service crane comprises a main crane beam having a track upon which a trolley can run. A hinge is provided at a pivot point near a proximate end of the main beam, such that an aft portion of the beam extends beyond the pivot point to the exterior of the turbine, the hinge being supported by an aft frame attached to a floor of the nacelle and connected to the main beam.

A distal end of the main beam rests upon a forward beam, which is supported by a forward frame attached to the floor of the nacelle. A lateral motion actuator operatively connected to the main beam moves the main beam back and forth along the forward beam. The trolley includes a longitudinal motion actuator such that the trolley runs back and forth along the main beam.

In operation the trolley is moved to the interior of the turbine where a turbine component is attached to a hook that is lowered by cable from the trolley. The trolley with the component on the hook is moved to the aft portion of the main beam, which extends beyond the turbine. The hook is then lowered to ground so that the component can be serviced or replaced.

The on-board service crane comprises a service crane structure supporting the housing and provides housing access to the nacelle exterior, from the service level through a housing door.

The service crane enables servicing the upper end of a wind turbine tower without the need to mobilize a large crane.

The capacity of the service crane is comparable to the weights lifted. The invention has the advantage that because the crane is an integral part of the nacelle it avoids the need to bring a ground level crane or special apparatus to the wind turbine site for accessing the components through removal of the nacelle top, in order to remove components and lower them down the ground for repair or replacement.

The invention has the advantage of lowering the cost of clean energy by reducing the maintenance and repair costs of wind turbines.

BRIEF DESCRIPTION OF THE DRAWINGS

The invention will be described in detail with reference to the drawings in which:

FIG. 5 is a schematic side view illustrating a portion of the nacelle of FIG. 4.

DESCRIPTION OF THE PREFERRED EMBODIMENTS

Figure 1:
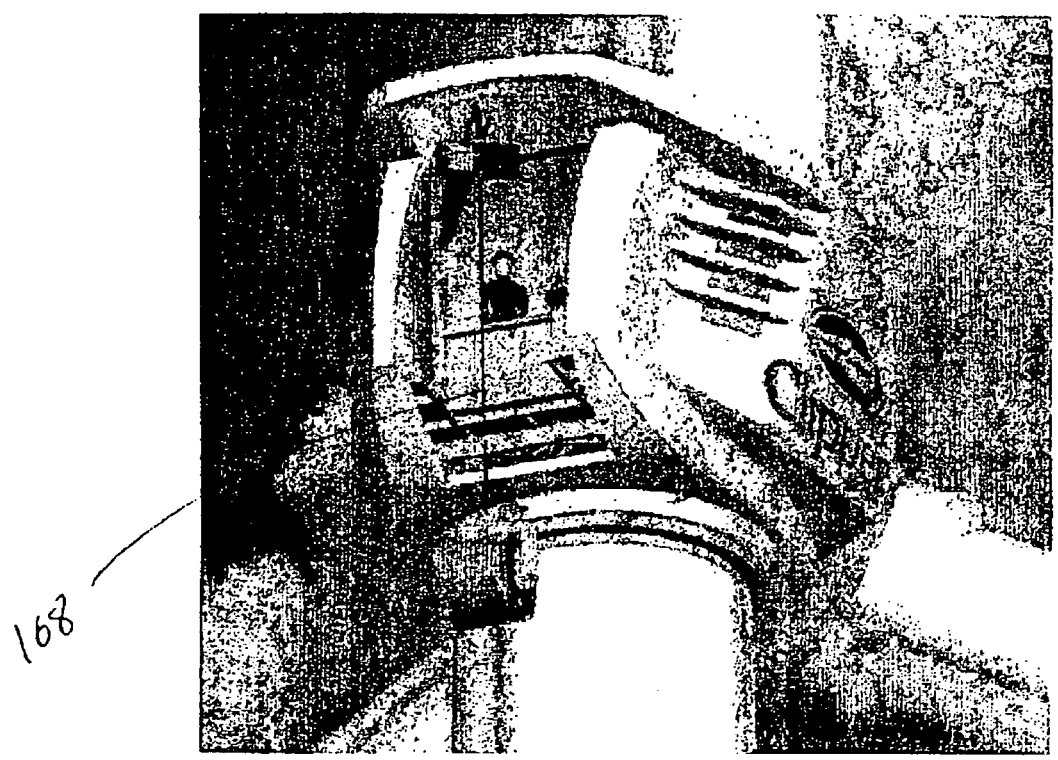
FIG. 1 is a perspective view of a crane within a nacelle for lifting turbine components to the nacelle located on the top of a tower.

Refer to FIG. 1, which is a perspective view of a crane within a nacelle for lifting turbine components to the nacelle located on the top of a tower. An on-board 2-ton capacity service crane is installed at the rear of the nacelle. A hinged or roll down door at the rear of the nacelle allows for components to be lowered and service tools and other materials to be raised from the ground. This crane allows for service of brakes, yaw motors, generators, gearbox pinion cartridges and other components. By avoiding the need to call out even a small service crane, the use of this on-board service crane is expected to produce a positive benefit to both scheduled and unscheduled maintenance costs.

Figure 2:
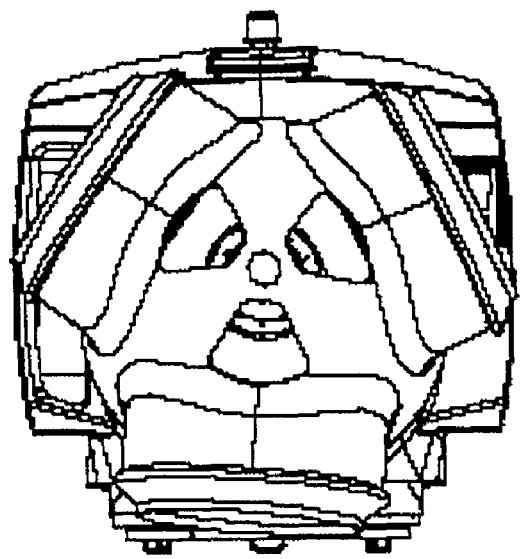
FIG. 2 is a front elevation view of the nacelle shown in FIG. 1.
Figure 3:
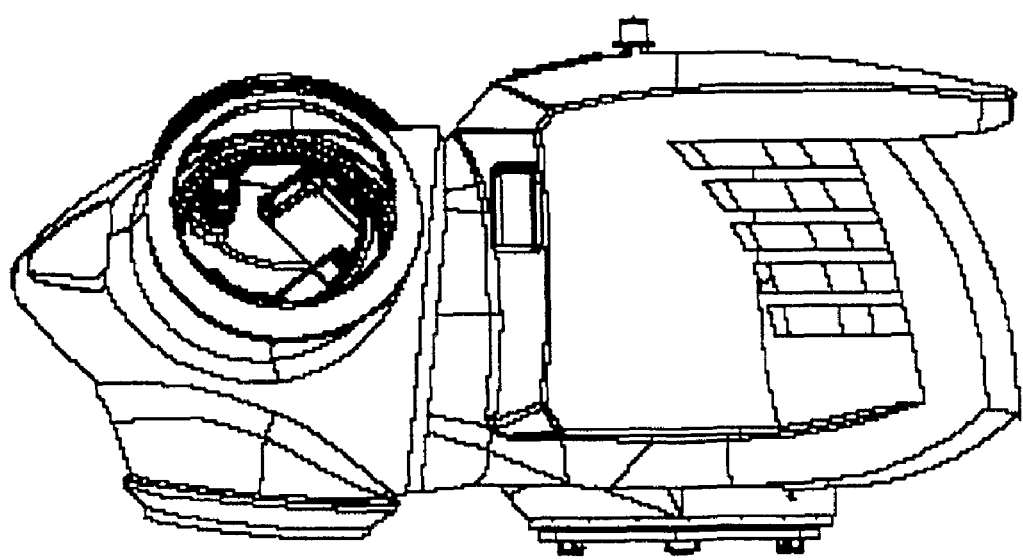
FIG. 3 is a port side view of the nacelle shown in FIG. 1.

Refer to FIG. 2, which is a front elevation view of the nacelle shown in FIG. 1 and to FIG. 3, which is a port side view of the nacelle shown in FIG. 1. The service crane structure supports the sides and top surfaces of the nacelle. There is access to the wind turbine components from the service level of the nacelle to the exterior through a rear door, shown in FIG. 1, and on the right-hand side of the drawing of FIG. 3.

Figure 4:
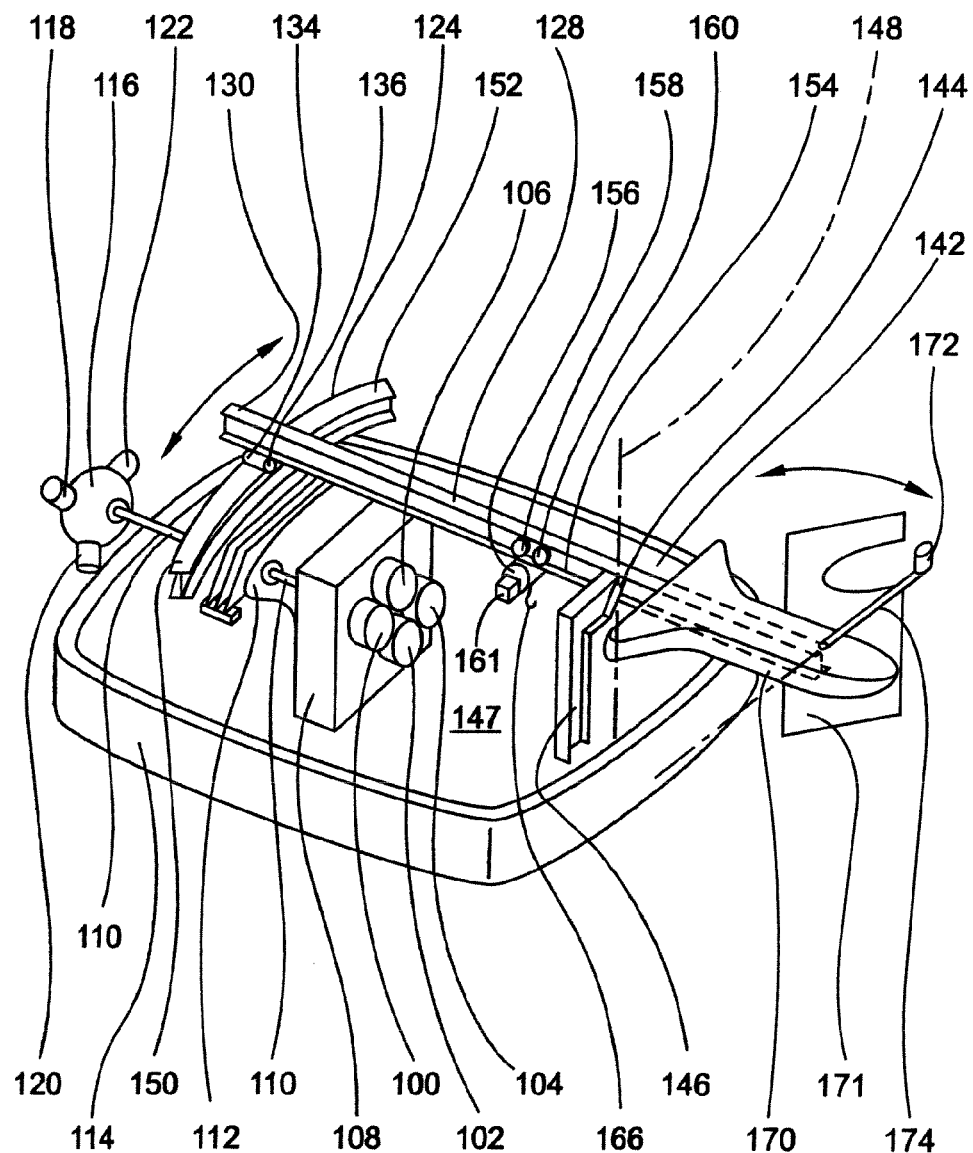
FIG. 4 is a perspective drawing showing the nacelle bed with the crane in the nacelle.

The nacelle is partially illustrated in FIG. 4 and is of a conventional "bathtub" shaped design. The nacelle houses a turbine having four generators, 100, 102, 104, 106 (schematically shown in FIG. 5), connected through a gearbox 108 to a main shaft 110 held in place by a main bearing 112 attached to the floor of the nacelle bathtub 114. The main shaft is connected to a rotor hub 116, which conventionally has three rotor blades, 118, 120, and 122, which are turned by wind. The rotor blades turn the main shaft 110, which moves gears in the gearbox 108. The gears turn the generators, which produce electricity from wind power.

The nacelle service crane includes a curved, stationary forward I-beam frame 124 attached to the main bearing 112 (as schematically shown in FIG. 5) and a linear, moveable I-beam crane rail 128 resting at a distal end 130 on the forward frame 124 by means of four rollers 134, 136, 138, 140. One or more of the rollers are connected to a lateral motion main beam actuator 131 (as schematically shown in FIG. 5), such as a servomotor, which when actuated causes the main beam to move in a lateral direction. Alternatively, a cable and pulley lateral motion actuator may achieve lateral motion. The proximate end 142 of the crane rail 128 is attached via a hinge 144 to a stationary aft frame 146 mounted on the floor of the nacelle bathtub 114. The crane rail can rotate about the hinge axis 148 within the outer limits 150, 152 set by the length of the forward frame upon which the distal end of the crane rail rests. A lower portion 154 of the crane-rail I-beam acts as an overhead monorail upon which a trolley 156 runs. The trolley is suspended from the overhead crane rail by means of four wheels 158, 160, 162, and 164, that straddle the crane rail I-beam. One or more of the rollers are connected to a longitudinal motion trolley actuator 161 (schematically shown in FIG. 4), such as a servomotor, which when actuated causes the trolley to move in a longitudinal direction along the crane rail. Alternatively, a cable and pulley longitudinal motion actuator may achieve longitudinal motion.

The trolley has a hook 166 that can be raised and lowered by a cable 168 and winch (not shown). The hook can be attached to a component, such as one of the generators, for the purpose of transporting it to the proximate end of the crane rail, which is outside of the nacelle. Because the crane rail is moveable about the pivot point 148, any one of the generators is accessible to the hook by moving the crane rail laterally. A fairing 170 is mounted at the proximate end 142 of the crane rail. The fairing is shaped so as to reduce drag, which may induce yaw. The winch mechanism is housed within the fairing, with the additional ability to operate the crane rail actuator to move the crane rail back and forth on the forward frame 124 and to operate the trolley actuator to move the trolley back-and-forth along the crane rail 128. The trolley is free to move past the aft frame 146 to the outside of the nacelle and into the fairing 170, which is also outside of the nacelle. Once outside the nacelle the hook 166 with component attached can be lowered by the cable to ground level for servicing the component.

The nacelle is fitted with a hinged or roll-up door 171, which is operated by a mechanism within the fairing to move the door out of the way to permit the trolley to exit the rear of the nacelle. The FAA pod 172 pivots forward on a moveable arm 174 to permit access. The crane support structural frame, the curved, stationary forward I-beam frame 124, stationary aft frame 146 mounted to the nacelle bathtub 114, also serve as structural support for the sides and top of the nacelle turbine housing. The sides and top of the nacelle are not shown in FIG. 4. The crane structure allows for horizontal delivery of components to the exterior of the nacelle through the rear door 171 from which they are lowered to ground level. Conventional designs require removal of the nacelle top and component extraction is performed vertically. Lateral movement of the crane's main beam 128 and the crane trolley 156 movement along the beam permit a full range of turbine component access. Since the service crane is an integral part of the wind turbine structure it is always available for maintenance or component replacement work. The use of existing structure allows the lifting crane to be cost effective, reliable and rated to required workload. This helps reduce the cost of clean energy by reducing the maintenance and repair costs of wind turbines.

While the invention has been particularly shown and described with reference to preferred embodiments thereof, it will be understood by those skilled in the art that the foregoing and other changes in form and detail may be made therein without departing from the scope of the invention.

The invention claimed is:

1. A service crane for a service level floor (114) of a wind turbine on top of a tower, comprising:
    a moveable main crane beam (128) having a track (154) for guidance of a trolley (156);
    a first frame (146) comprising a hinge (144) at a pivot point (148), wherein the crane beam (128) is connected to the hinge (144) and pivots in a substantially horizontal plane about the pivot point such that a first portion of the crane beam (128) extends beyond the pivot point (148) to a proximal end (142) of said crane beam and a second portion of the crane beam extends beyond the pivot point to a distal end (130) of said crane beam, wherein said proximate end (142) of the crane beam extends beyond the service level floor (114) enabling a movement of the trolley (156) beyond the wind turbine service level floor; and,
    a stationary beam (124) which is connected with said distal end (130) of the crane beam (128) such that said distal end of the crane beam (128) can laterally move along the stationary beam (124).

2. The service crane of claim 1, wherein the track (154) is designed as an overhead monorail upon which the trolley (156) can run.

3. The service crane of claim 1 or 2, wherein the first frame (146) is attached to the service level floor.

4. The service crane of claim 1, wherein the crane beam (128) rests on the stationary beam (124).

5. The service crane of claim 1, wherein the stationary beam (124) is supported by a second frame (112).

6. The service crane of claim 5, wherein the second frame (112) comprises a main bearing attached to the service level floor.

7. The service crane of claim 1, wherein a lateral motion actuator is operatively connected to the crane beam (128) to move the crane beam (128) laterally along the stationary beam (124).

8. The service crane of claim 1, wherein the stationary beam (124) is curved.

9. The service crane of claim 1, wherein a fairing (170) is mounted to a proximate end (142) of the crane beam (128), the fairing (170) is shaped so as to reduce drag.

10. The service crane of claim 1, wherein a longitudinal motion actuator is operatively connected to the trolley (156).

11. A service crane for a service level floor of a wind turbine on top of a tower, comprising:
- a linear, moveable main crane beam having a track for guidance of a trolley, a first end of the crane beam resting on a curved, stationary beam; and,
- a first frame including a hinge located at a pivot point, the crane beam being connected to the hinge such that it pivots in a substantially horizontal plane about the pivot point and that a second end of the crane beam extends beyond the pivot point and beyond a periphery of the wind turbine service level floor of the tower;
- wherein the crane beam pivots at the pivot point such that the first end of the crane beam moves laterally along the stationary beam.

12. The service crane of claim 11, wherein the track is designed as an overhead monorail upon which the trolley can run.

13. The service crane of claim 11, wherein the first frame is attached to the service floor.

14. The service crane of claim 11 further including a second frame, the second frame supports the curved, stationary beam.

15. The service crane of claim 14, wherein the second frame includes a main bearing attached to the service level floor.

16. The service crane of claim 11, wherein a lateral motion actuator is operatively connected to the crane beam to move the first end of crane beam laterally along the curved, stationary beam.

17. The service crane of claim 11 further including a fairing mounted to the second end of the crane beam, wherein the fairing is shaped so as to reduce drag.

18. The service crane of claim 11 further including a longitudinal motion actuator operatively connected to the trolley.

* * * * *